(12) United States Patent
Kamat

(10) Patent No.: US 8,250,153 B2
(45) Date of Patent: *Aug. 21, 2012

(54) EMAIL SYSTEM INCLUDING EMAIL AGGREGATION SERVER PROVIDING STAGGERING OF OVERLAPPED POLLING

(75) Inventor: Harshad N. Kamat, Maple Valley, WA (US)

(73) Assignee: Research In Motion Limited, Waterloo, Ontario (CA)

( * ) Notice: Subject to any disclaimer, the term of this patent is extended or adjusted under 35 U.S.C. 154(b) by 450 days.

This patent is subject to a terminal disclaimer.

(21) Appl. No.: 11/734,891

(22) Filed: Apr. 13, 2007

(65) Prior Publication Data

US 2008/0256196 A1 Oct. 16, 2008

(51) Int. Cl.
*G06F 15/16* (2006.01)
*G06F 15/173* (2006.01)
*G06F 15/177* (2006.01)

(52) U.S. Cl. ......... 709/206; 438/113; 438/114; 438/162

(58) Field of Classification Search .......... 709/200–206, 709/217–228; 348/113, 114, 162
See application file for complete search history.

(56) References Cited

U.S. PATENT DOCUMENTS

| 2002/0032018 A1* | 3/2002 | Morton et al. | 455/412 |
| 2006/0293032 A1 | 12/2006 | Clarke et al. | 455/412.2 |
| 2007/0072589 A1 | 3/2007 | Clarke | 455/414.1 |
| 2007/0161364 A1* | 7/2007 | Surineni et al. | 455/343.4 |
| 2009/0013087 A1* | 1/2009 | Lorch et al. | 709/232 |

FOREIGN PATENT DOCUMENTS

EP 1 557 987 A1 7/2005

OTHER PUBLICATIONS

Ward Foster, et al; Method for Reducing Polling Traffic Within a Mailbox Communication System.

* cited by examiner

*Primary Examiner* — Haresh N Patel
(74) *Attorney, Agent, or Firm* — Allen, Dyer, Doppelt, Milbrath & Gilchrist, P.A.

(57) ABSTRACT

An electronic mail (email) system may include at least one email server having mailboxes for storing email messages, and a plurality of mobile wireless communications devices. The system may further include at least one email aggregation server for repetitively polling the mailboxes for email messages, and forwarding the email messages to respective mobile wireless communications devices. The at least one email aggregation server may determine time overlapped polling of corresponding mailboxes and time stagger a next polling thereof.

22 Claims, 17 Drawing Sheets

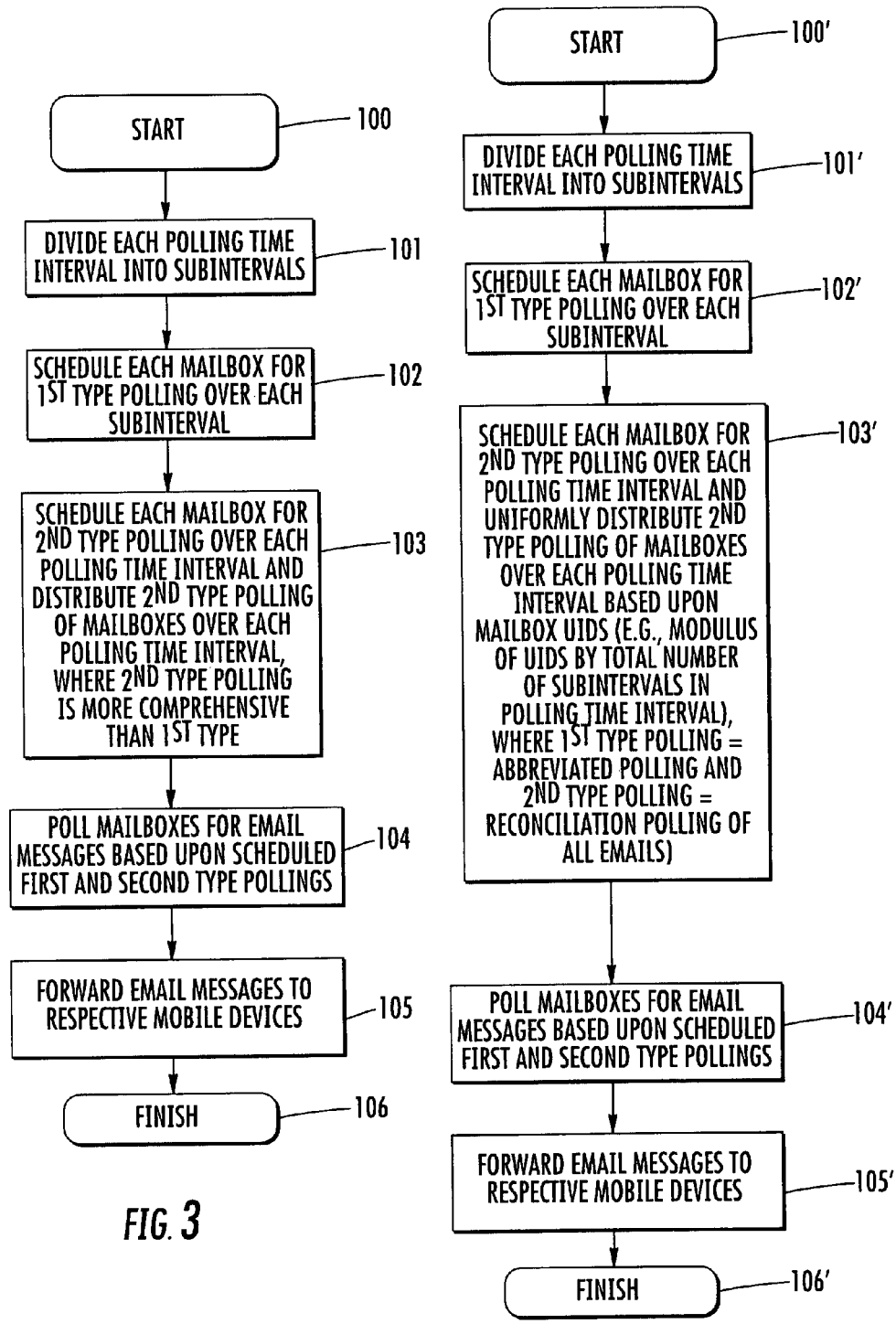

EMAIL SYSTEM INCLUDING EMAIL AGGREGATION SERVER PROVIDING STAGGERING OF OVERLAPPED POLLING

FIELD OF THE INVENTION

The present invention relates to the field of communications systems, and, more particularly, to electronic mail (email) communications systems and related methods.

BACKGROUND OF THE INVENTION

Electronic mailboxes reside on electronic mail (email) servers and are used to store email messages. Electronic mailboxes are connected to the Internet to enable users to send and receive incoming and outgoing email messages. These mailboxes may also be extended to deliver email to mobile wireless communication devices via wireless networks. In the case of a corporation, electronic mailboxes are typically located on email servers at the corporation. On the other hand, mailboxes for small businesses or individuals are typically located on Internet service provider (ISP) email servers.

Mail user agents (MUAs) are applications which use a technique called polling to relay messages from the email server to the mail program at a user's computer or mobile wireless communications device. A MUA is a program running either on a user's personal computing device (mobile or stationary), or on a shared email relay server that checks for new mail on behalf of a multitude of such users. More particularly, polling is the retrieval of incoming messages from other users at the mail server and delivery of these messages to the user's mailbox.

One particularly advantageous email retrieval system is disclosed in U.S. Patent Pub. No. 2006/0293032 to Clarke et al., which is assigned to the present Assignee. This system includes at least one wireless communications device and at least one email server for storing email messages for the at least one wireless communications device. The system further includes an email relay server for detecting a new email message on the at least one email server and, based thereon, sending a short message service (SMS) notification with a unique message identifier (ID) of the new email message to the at least one wireless communications device. Moreover, the at least one wireless communications device detects the SMS notification and sends an email retrieval request to the email relay server instructing the email relay server to retrieve the new email message based upon the unique message ID.

One potential difficulty in detecting new email messages on email servers is that as the number of system users grows, so too does the number of mailboxes that the MUA will have to poll for email messages. As such, it may be desirable in certain applications to provide efficient approaches for scheduling polling operations to reduce over-utilization and/or under-utilization of polling resources at any given time.

BRIEF DESCRIPTION OF THE DRAWINGS

FIGS. 3 and 4 are flow diagrams illustrating related method aspects for the system of FIG. 1.

DETAILED DESCRIPTION OF THE PREFERRED EMBODIMENTS

Figure 1:
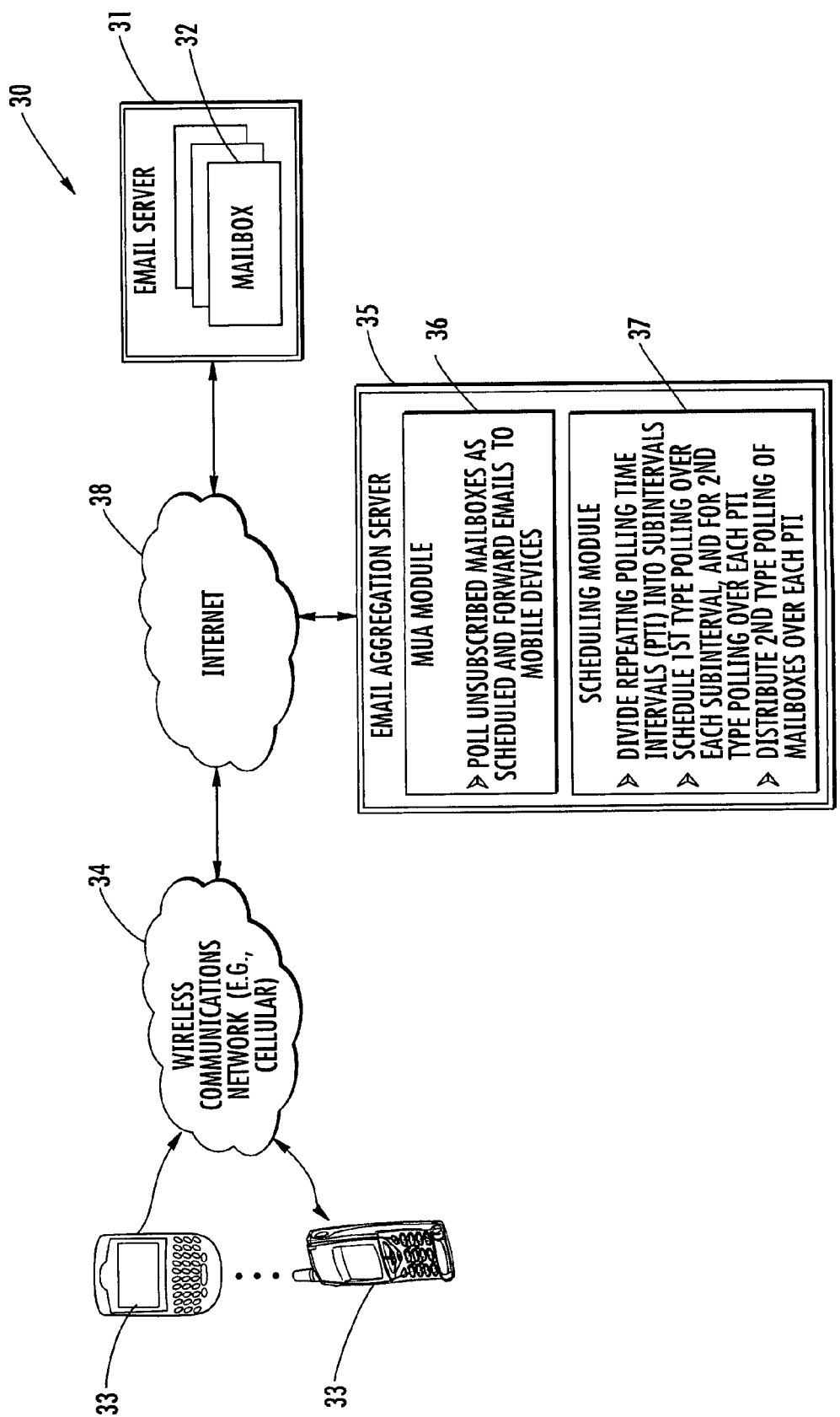
FIG. 1 is a schematic block diagram of an email system in accordance with one embodiment providing distributed polling of mailboxes.

The present description is made with reference to the accompanying drawings, in which preferred embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements or steps in different embodiments.

Generally speaking, an electronic mail (email) system is disclosed herein which may include at least one email server having mailboxes for storing email messages, and a plurality of mobile wireless communications devices. More particularly, the system may further include at least one email aggregation server for repetitively polling the mailboxes for email messages, and forwarding the email messages to respective mobile wireless communications devices. Moreover, the at least one email aggregation server may determine time overlapped polling of corresponding mailboxes and time stagger a next polling thereof.

More particularly, the at least one email aggregation server may poll the mailboxes at least once during a repeating polling time interval. Furthermore, the at least one email aggregation server may time stagger next pollings based upon the formula:

$$Tn(x) = Tc + I + x\Delta t,$$

where $Tn(x)$ is a next polling time for a given overlapped polling, $Tc$ is a current time, $I$ is the polling time interval, $x$ is an integer number between 1 and a total number of overlapped pollings to be staggered, and $\Delta t$ is a staggering interval. By way of example, each polling time interval may have a duration in a range of 30 minutes to 180 minutes.

In addition, the at least one email aggregation server may determine time overlapped polling based upon polling of corresponding mailboxes beginning within a time overlap threshold. Moreover, the at least one email aggregation server may perform a first type polling unless a threshold time has elapsed since a last second type polling, where the second type polling is more comprehensive than the first type polling.

For example, the first type polling may comprise an abbreviated polling for new emails, and the second type polling may comprise a reconciliation polling of all emails. Also, at least some of the mobile wireless communications devices may comprise cellular communications devices.

An email aggregation server may include an aggregation module for repetitively polling mailboxes on at least one email aggregation server for email messages, and forwarding the email messages to respective mobile wireless communications devices. The email aggregation server may also include a scheduling module for determining time overlapped polling of corresponding mailboxes and time staggering a next polling thereof.

An email aggregation method aspect is also provided which may include repetitively polling mailboxes on at least one email aggregation server for email messages, and forwarding the email messages to respective mobile wireless communications devices. The method may further include determining time overlapped polling of corresponding mailboxes and time staggering a next polling thereof.

Referring initially to FIG. 1, an email system 30 illustratively includes at least one email server 31 having mailboxes 32 for storing email messages therein, as will be appreciated by those skilled in the art. By way of example, the email server(s) 31 may be corporate email servers, email servers hosted by ISPs, etc. The system 30 also illustratively includes a plurality of mobile wireless communications devices 33. By way of example, the devices 33 may be cellular devices that are capable of sending and receiving emails via a wireless (i.e., cellular) communications network 34. However, other types of wireless devices (and networks), such as wireless local area network (WLAN) devices, may also be used in some embodiments. Moreover, in some embodiments the devices 33 may be enabled for communicating via more than one type of wireless network (e.g., via a cellular network and a WLAN).

The system 30 further illustratively includes one or more email aggregation servers 35 comprising a mail user agent (MUA) module 36 for polling the mailboxes 32 for email messages and forwarding the email messages to respective mobile wireless communications devices 33. The email aggregation server 35 may also be referred to as an email relay server or email proxy server in some applications. More particularly, a given user of a device 33 will typically have one or more email accounts with one or more email service providers hosting the email server(s) 31. The user registers the various accounts with the provider of the email aggregation server 35, and with the registration information provided (e.g., email address, login information, etc.), the email aggregation server 35 is able to poll the mailboxes and retrieve emails therefrom to forward to the mobile devices 33, as will be appreciated by those skilled in the art.

The MUA module 36 may also perform other tasks, such as synchronizing or deleting emails in the mailboxes 32, changing attributes of emails (e.g., from unread to read), etc. The email aggregation server 35 further illustratively includes a scheduling module 37 for scheduling polling operations, as will be discussed further below. As will be appreciated by those skilled in the art, the MUA module and 36 and scheduling module 37 may be implemented using a combination of hardware (e.g., processor, memory, etc.) and software components. The email aggregation server 35 communicates with the wireless communications network(s) 34 and email server(s) 31 via a wide area network, such as the World Wide Web/Internet 38 in the illustrated example.

Figure 5:
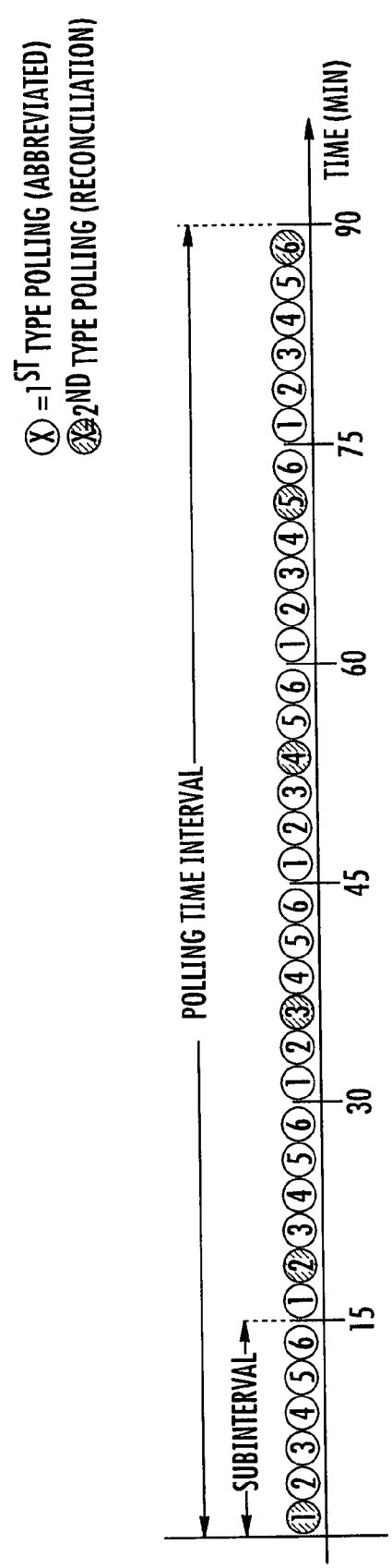
FIG. 5 is a timeline graph illustrating distributed polling operations of the system of FIG. 1.
Figure 6:
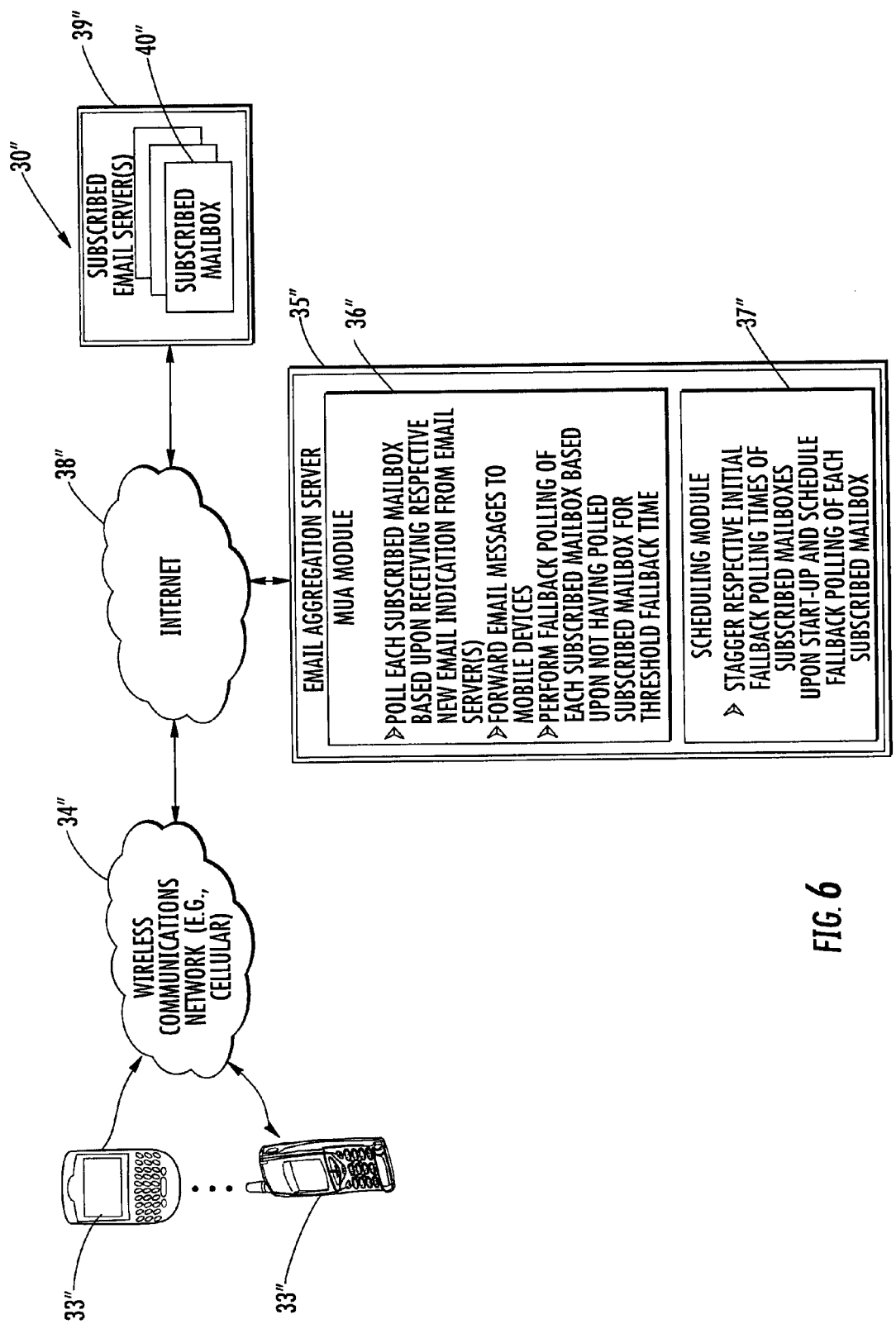
FIG. 6 is a schematic block diagram of another email system providing fallback polling.
Figure 7:
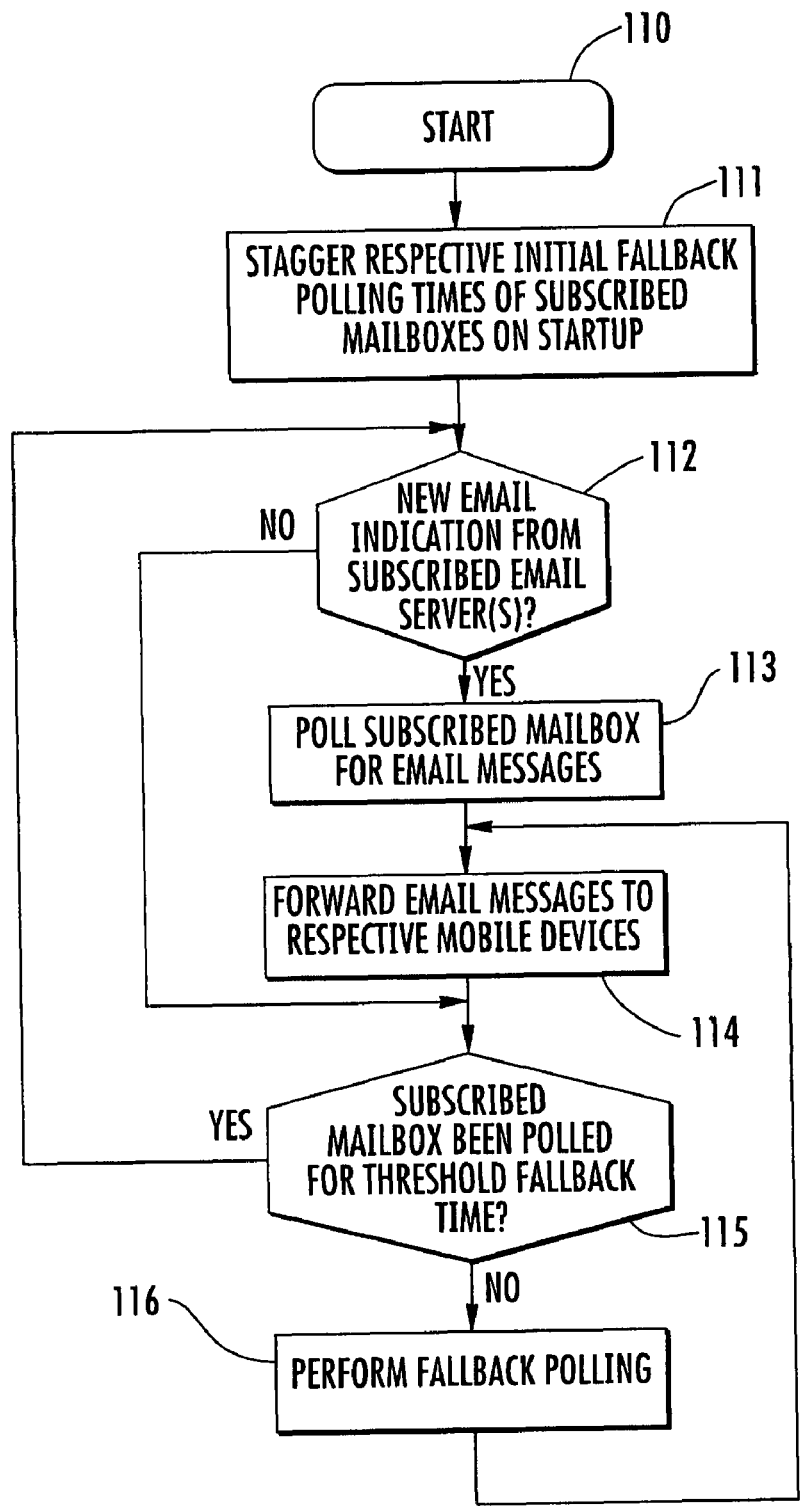
FIGS. 7 and 8 are flow diagrams illustrating related method aspects for the system of FIG. 6.
Figure 8:
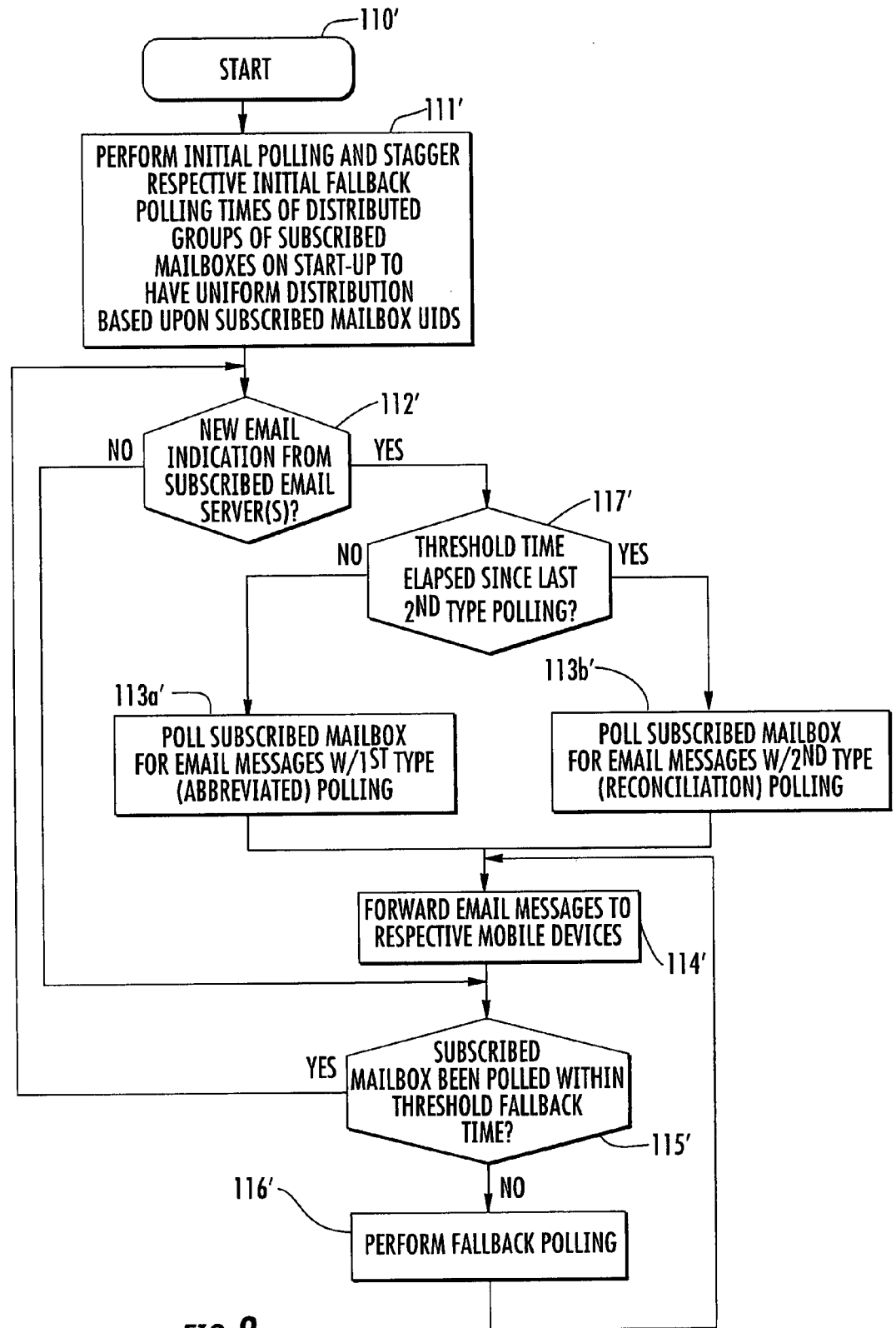

Referring more particularly to FIGS. 3-5, in an exemplary polling approach beginning at Block 100, the scheduling module 37 divides each of a plurality of repeating polling time intervals into a plurality of subintervals, at Block 101, and schedules each mailbox 32 for at least a first type polling over each subinterval and for a second type polling over each polling time interval, at Blocks 102-103. By way of example, each polling time interval may have a duration in a range of 30 minutes to 180 minutes, and each subinterval may have a duration in a range of 5 to 60 minutes. The mailboxes 32 are polled as scheduled, at Block 104, and retrieved messages are forwarded to respective mobile wireless communications devices 33, at Block 105, thus concluding the illustrated method (Block 106). While shown as concluding at Block 106 for clarity of illustration, it will be appreciated that the above-described polling operation is repeated during operation.

In the example illustrated in FIG. 5, there are six mailboxes ((1)-(6)), the repeating polling time interval is 90 minutes, and the polling time interval is divided into six subintervals of 15 minutes each. Thus, each mailbox 32 is scheduled for a first type polling (indicated by a black number on a white circular background) once every fifteen minutes, and a second type polling (indicated by a white number on a black circular background) once every ninety minutes.

More particularly, the second type polling is more comprehensive than the first type polling. By way of example, the first type polling is preferably a "quick" or abbreviated polling for new emails only. This may be done, for example, by assuming that the email server 31 arranges emails in the mailboxes 32 in chronological order of receipt. As such, the MUA module 36 stores time/date information for the most recent email in a given mailbox 32 located during the last polling. When performing an abbreviated polling, the MUA module 36 then checks the time/date information of the first email in the mailbox 32 (which is assumed to be the most recent email) and continues to work through the emails in order until the email is found that matches the stored time/date information. This indicates to the MUA module 36 that it has found the end of the new email messages, as will be appreciated by those skilled in the art.

On the other hand, the second type polling is preferably a "full" or reconciliation polling of all emails in a given mailbox 32. That is, rather then only checking the latest emails in a given mailbox 32, the MUA module 36 instead compares each of the email messages in the mailbox to a list or index of emails stored by the MUA module created during a last reconciliation polling (and updated through subsequent abbreviated pollings). It is desirable to perform a reconciliation polling because emails are on occasion not stored in chronological order in a given mailbox 32, and thus new email messages can be missed by abbreviated polls. Moreover, this allows the MUA module 36 to determine when emails have been read, deleted, etc., so that corresponding reconciliation operations can be performed, as will be appreciated by those skilled in the art. Yet, a full reconciliation polling requires a significant amount of processing time, both by the MUA module 36 and the email server 31. This is why abbreviated polls are preferably performed at relatively short intervals to provide quick retrievals of new emails, and reconciliation polls are still performed but less often (e.g., once during the polling time interval).

In the example illustrated in FIG. 5, the scheduling module 37 uniformly distributes the second type polling (i.e., reconciliation polling) of the mailboxes 32 over each repeating polling time interval (Block 103'). More particularly, the scheduling module 37 does this by uniformly distributing the reconciliation polling of the mailboxes 32 among the subintervals. Thus, with six subintervals in each polling time interval, in the present example the scheduling module 37 schedules one-sixth of the mailboxes for a reconciliation polling during each of the subintervals. In the illustrated example with six mailboxes, this means that mailbox (1) receives a reconciliation polling during the first subinterval between 0 and 15 min., the second mailbox (2) receives a reconciliation polling in the second subinterval between 15 and 30 minutes, etc.

It should also be noted that in the illustrated example the reconciliation polling replaces the otherwise scheduled abbreviated polling during the particular subinterval when the reconciliation polling is scheduled. However, this need not be the case in all embodiments, as an abbreviated and reconciliation polling could still be performed for the same mailbox 32 in a given subinterval, if desired. Also, it should be further noted that the polling time interval and subinterval values provided above are given by way of example, and that other values may also be used in different embodiments.

One way in which the scheduling module 37 may perform the uniform distribution is based upon a unique identifier (UID) associated with each mailbox 32. More particularly, the email server 35 may assign or store (e.g., the UID could be assigned by the email server 31) a UID for each mailbox 32, and the distribution may be based upon the UID. For example, numerically and/or alphabetically lower UID numbers could be assigned to earlier subintervals in the polling time interval, and the greater UIDs assigned to later subintervals. An example where the scheduling module 37 distributes polling of the mailboxes among the subintervals based upon a modulus of the UIDs by a total number of the polling time subintervals will be discussed further below.

Figure 2:
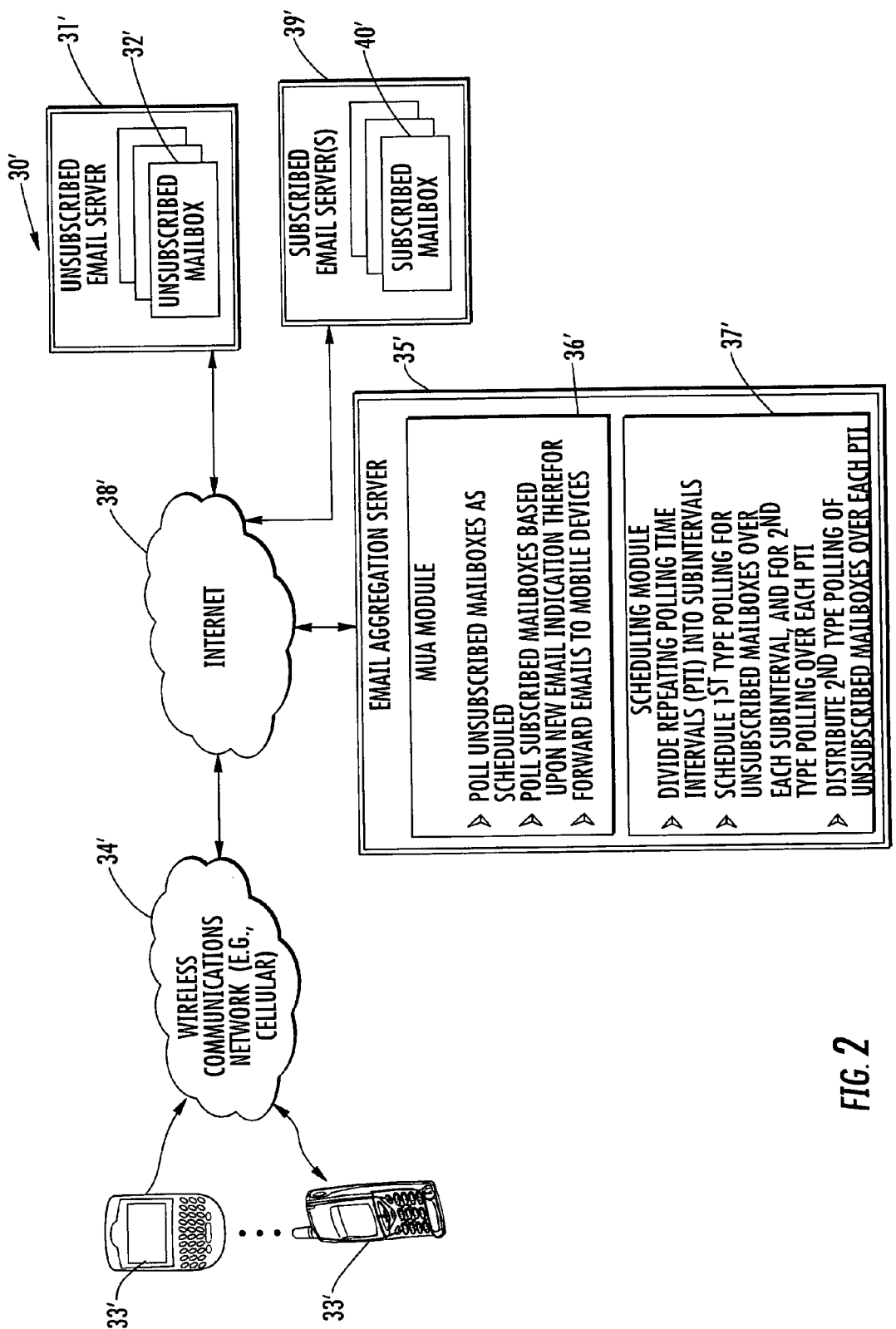
FIG. 2 is a schematic block diagram of an alternative embodiment of the system of FIG. 1 providing polling of unsubscribed and subscribed emails servers.

Referring now additionally to FIG. 2, the above-described scheduling and polling approach is particularly advantageous for unsubscribed email servers. That is, an unsubscribed email server does not send new email indications or notifications to the email aggregation server 35' upon receiving new email messages. Rather, the email aggregation server 35' has to discover new email messages on its own using the above-described polling operations, for example. However, in some applications a subscribed email server(s) 39' having subscribed mailboxes 40' may advantageously send a notification to the email aggregation server 35' when a new email message arrives for a given mailbox.

In this way, for subscribed mailboxes 40' the email aggregation server 35' need not perform scheduled abbreviated polling to discover new email messages, since it will be notified when new emails are available by the subscribed email server 39' (although abbreviated polling could still be used, if desired). Instead, the MUA module 36' polls a subscribed mailbox 40' based upon receiving a new email indication therefor (i.e., it waits to receive a new email indication before polling). Here again, it may be desirable to balance the type of polling used for a subscribed mailbox 40' (i.e., first or second type polling) to not unduly burden server resources, yet at the same time keep a fairly up-to-date record of all of the emails in a given subscribed mailbox 40'. As such, the MUA module 36' may advantageously wait to poll for email messages for a given subscribed mailbox 40' until an email notification is received, and responsive thereto use an abbreviated poll if it has been less than the polling time interval (e.g., 90 minutes) since a last reconciliation poll, otherwise a reconciliation poll is performed. However, other configurations are also possible.

Referring now additionally to FIGS. 6-9, despite obtaining notifications from a subscribed email server 39" of new email messages, there may be long periods when no notification is received from the subscribed email server for one or more subscribed mailboxes 40". This could occur for several reasons, one of which is that the given subscribed mailbox 40" has received no new emails. Yet, this could also be because the subscribed email server 39" is not properly sending notifications for some reason. As such, it may be desirable in some embodiments to also perform a fallback polling of each subscribed mailbox 40" if the mailbox has not been polled for a threshold fallback time. That is, if no notification of new emails has been received by the email aggregation server 35" within the threshold fallback time for a given mailbox 40", then a fallback polling of the mailbox is performed.

Figure 9:
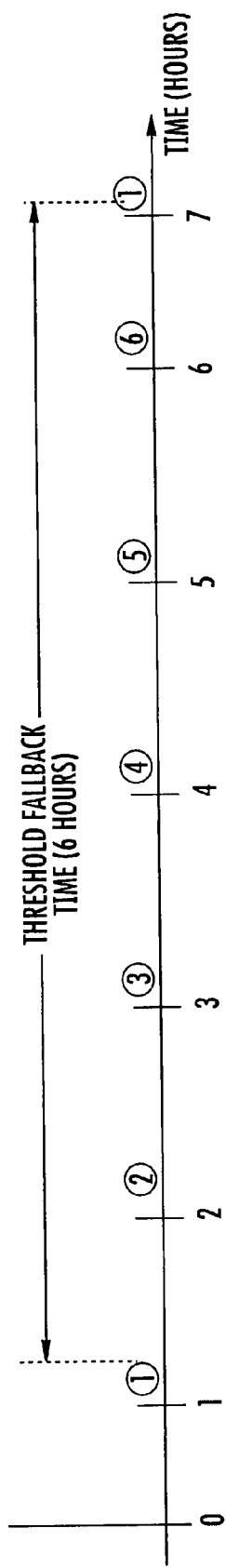
FIG. 9 is a timeline graph illustrating fallback polling operations of the system of FIG. 6.

By way of example, in the illustrated example of FIG. 9 the threshold fallback time is 6 hours, but other threshold fallback times may also be used. One potential problem that can occur with fallback polling operations occurs at start-up of the email aggregation server 35" (or components thereof). In particular, upon start-up the scheduling module 37" would ordinarily set all of the threshold fallback times for each mailbox to 6 hours from the start-up time (i.e., the 6-hour mark in FIG. 9). Yet, if no notification was received for many of the subscribed mailboxes 40" within the six hour period, this would otherwise mean that numerous fallback polling operations would all come due at the same time. Using the above-described rule that a reconciliation poll is performed if there has been no reconciliation poll within the prior polling time interval (e.g., 90 minutes), then this means that numerous reconciliation polls would all come due substantially simultaneously, leading to an undesirably large processing load.

Beginning at Block 110, upon start-up the scheduling module 37" advantageously staggers respective initial fallback polling times of the subscribed mailboxes 40", at Block 111. In some embodiments, it may also be desirable to perform an initial polling of each subscribed mailbox 40" upon start-up (Block 111'), which could include first and/or second type pollings, since the email aggregation server 35" may have been offline for a significant amount of time. Here again, the distribution of the fallback polling times may be uniform, and it may be done in groups. In the example of FIG. 9 where there are six subscribed mailboxes ((1)-(6)), one-sixth of the mailboxes (which equals one mailbox in this example) are polled every hour beginning one hour after start-up. Moreover, the distribution may be determined based upon UIDs of the subscribed mailboxes 40", as similarly described above. Further details on staggering the fallback polling times upon start-up will be discussed below.

When a new email indication is received from the subscribed email server 39", at Block 112, the MUA module 36" polls the appropriate mailboxes 40" (Block 113) using either an abbreviated poll or a reconciliation poll, as discussed further above (Blocks 117, 113a', 113b'), and forwards emails to respective mobile wireless communications devices 33" accordingly, at Block 114. As also discussed above, if a subscribed mailbox 40" has not been polled for the threshold fallback time (i.e., it has not received a notification of new email during this time), then a scheduled fallback polling is performed, at Blocks 115-116, and the fallback polling period is reset (i.e., the next fallback polling is scheduled a duration equal to the threshold fallback time from a current time).

The above-described polling and scheduling operations will be further understood with reference to an exemplary implementation thereof. As mentioned above, if no effort is made to distribute unsubscribed and subscribed mailbox polling and they become due for reconciliation polls and/or fallback polls at about the same time, then the email aggregation server 35' sees much more load during these times than usual. For ease of reference, a glossary of terms used in the following example is as follows:

srcMboxId is the unique identifier of a mailbox;
lastPollTime is the last time at which a mailbox was polled;
nextPollTime is the next time at which a mailbox will be due for polling; and
lastFullPollTime is the last time at which a mailbox was full polled.

A mailbox becomes due for polling when its nextPollTime is ≦Now (where Now is the current system time), at which time the scheduling module 37' submits it for polling, sets its lastPollTime to Now and schedules it for polling again by calculating its nextPollTime. If it has been 90 minutes or greater since the source has been full polled, as indicated by the lastFullPollTime, then a reconciliation poll is initiated. Otherwise, an abbreviated poll is initiated for the mailbox.

It is assumed that, on average, all unsubscribed mailboxes 32' should be polled at least once every 15 minutes. On the other hand, subscribed mailboxes 40' are polled when the email aggregation server 35' receives a notification of new mail in a given subscribed mailbox. Subscribed mailboxes 40' also have a fallback poll scheduled 6 hours after the last new mail notification received by the email aggregation server 35'. Each mailbox (subscribed and unsubscribed) is due for a reconciliation poll once every 90 minutes, although subscribed mailboxes may go longer than 90 minutes without being polled if no notification has been received. Assuming a polling time interval of 90 minutes and a fallback poll duration of 6 hours, all fallback polls by default will be reconciliation polls. As noted above, all of these values are configurable.

Since reconciliation polling is relatively processing intensive, if an attempt is not made to organize the polling of mailboxes such that they become due for reconciliation polls at different times, many or all unsubscribed mailboxes 32' will become due for a full reconciliation poll in the same polling interval (e.g., 15 minutes) thereby burdening the email aggregation server 35' during that period.

Accordingly, at system start-up when the bulk of the unsubscribed mailboxes 32' would otherwise be added by the scheduling module 37' for polling, the mailboxes are organized in such a way that they do not all become due for a reconciliation poll in the same 15 minute interval by spreading the full polls over a 90 minute period, i.e., the polling time interval. This is done by first calculating how many subintervals there are in the polling time interval, and then uniformly distributing all mailboxes to be full reconciliation polled (i.e., the unsubscribed mailboxes 32') into these subintervals. This will ensure that the MUA module 36' is not burdened at start-up and subsequently when the mailboxes become due for full reconciliation polling again.

Since the srcMboxIds are unique within each email aggregation server 35' and/or MUA module 36', a modulus of the srcMboxId by the subintervals, which will yield a uniform distribution over the intervals, is taken to assign each mailbox to one of the subintervals. For example, since each unsubscribed mailbox 32' has to be reconciliation polled once every 90 minutes, there will be 6 intervals of 15 minutes each in which to do it, as shown in FIG. 5. Each mailbox is then assigned a lastFullPollTime such that they become due for a full poll sometime over the next 90 minutes, that is:

$$\text{lastFullPollTime} = \text{Now} - 15 \cdot X,$$

where X=(srcMboxId mod 6)+1.

So, if $$X=1, \text{lastFullPollTime}=(\text{Now}-(15*1))=(\text{Now}-15)$$

$$X=2, \text{lastFullPollTime}=(\text{Now}-(15*2))=(\text{Now}-30)$$

$$X=3, \text{lastFullPollTime}=(\text{Now}-(15*3))=(\text{Now}-45)$$

$$X=4, \text{lastFullPollTime}=(\text{Now}-(15*4))=(\text{Now}-60)$$

$$X=5, \text{lastFullPollTime}=(\text{Now}-(15*5))=(\text{Now}-75)$$

$$X=6, \text{lastFullPollTime}=(\text{Now}-(15*6))=(\text{Now}-90).$$

Therefore, mailboxes that are given a lastFullPollTime of (Now−90) will become due for a full reconciliation poll in the first 15 minutes, and those with (Now−15) will become due for a full reconciliation poll in the last 15 minutes of a 90 minute interval with the others in between. In this way, by assigning lastFullPollTimes at start-up, the scheduling module 37' will cause reconciliation polls to be initiated for all of the mailboxes in 90 minutes by initiating reconciliation polls for only ⅙th of the sources every 15 minutes.

Similar to the reconciliation polls, when subscribed mailboxes 40' are added to the scheduling module 37' at system start-up, the fallback polling times are spread or staggered as noted above such that all subscribed mailboxes do not become due for fallback polling all at once. For example, with a fallback poll time of 6 hours and polling time interval of 90 minutes, all subscribed mailboxes 40' would otherwise become due for a full poll in 6 hours after start-up if they had received no notifications during this time. If no attempt is made to stagger their nextPollTimes then they all will become due for a full poll in the same 15 minute interval. Assuming, for example, that approximately 50% of the total mailboxes to be polled by the MUA module 36' are subscribed mailboxes 40', the MUA module 36' would then be required to perform twice the number of polls in a 15 minute subinterval than it does in other 15 minute subintervals.

Since the nextPollTime for subscribed mailboxes 40' will be moved out 6 hours from the last time the MUA module 36' receives a new mail notification (and since the arrival of new mail in a mailbox is a truly random event), the scheduled fallback pollings of the subscribed mailboxes will eventually be substantially uniformly distributed. However, since restarts following system maintenance normally happen in off-peak hours when most users do not receive any email, if no attempt is made to stagger the nextPollTime of subscribed mailboxes 40' then they will likely become due for their fallback poll at about the same time, thus burdening the MUA module 36' until users start receiving new emails.

At system start-up, all mailboxes (subscribed and unsubscribed) are polled once in the first (i.e., 15 minute) polling subinterval, one-sixth of which are reconciliation polls and the rest are abbreviated polls. Subsequently, when it comes to calculating the nextPollTime for subscribed mailboxes 40', assuming a fallback poll time of 6 hours, instead of just pushing them out another 6 hours, their nextPollTimes are uniformly distributed in a 5 hour window. A 5-hour window is chosen instead of 6 because all subscribed mailboxes 40' were just polled in the first 15 minute interval and thus any subsequent polling for them is set out for at least another hour, although other durations could be used as noted above. As such, $$\text{nextPollTime} = \text{Now} + X + Y,$$

where X=60 minutes, which is added to nextPollTime so that it is not due for polling for at least another hour since it was just polled, as noted above, and Y=(srcMboxId mod 300) to make it due anytime in the 5 hours after that. Since the srcMboxIds are unique, a modulus of the srcMboxId by 300 will be truly uniform over the 5 hour period. Thus, after system start-up, once all the mailboxes (subscribed and unsubscribed) are polled once in the first 15 minutes, all the subscribed mailboxes 40' will be evenly distributed over a 5 hour period so that they become due for their fallback polling at different times that are spread over 5 hours instead of all at once in the same 15 minute interval after 6 hours.

Figure 10:
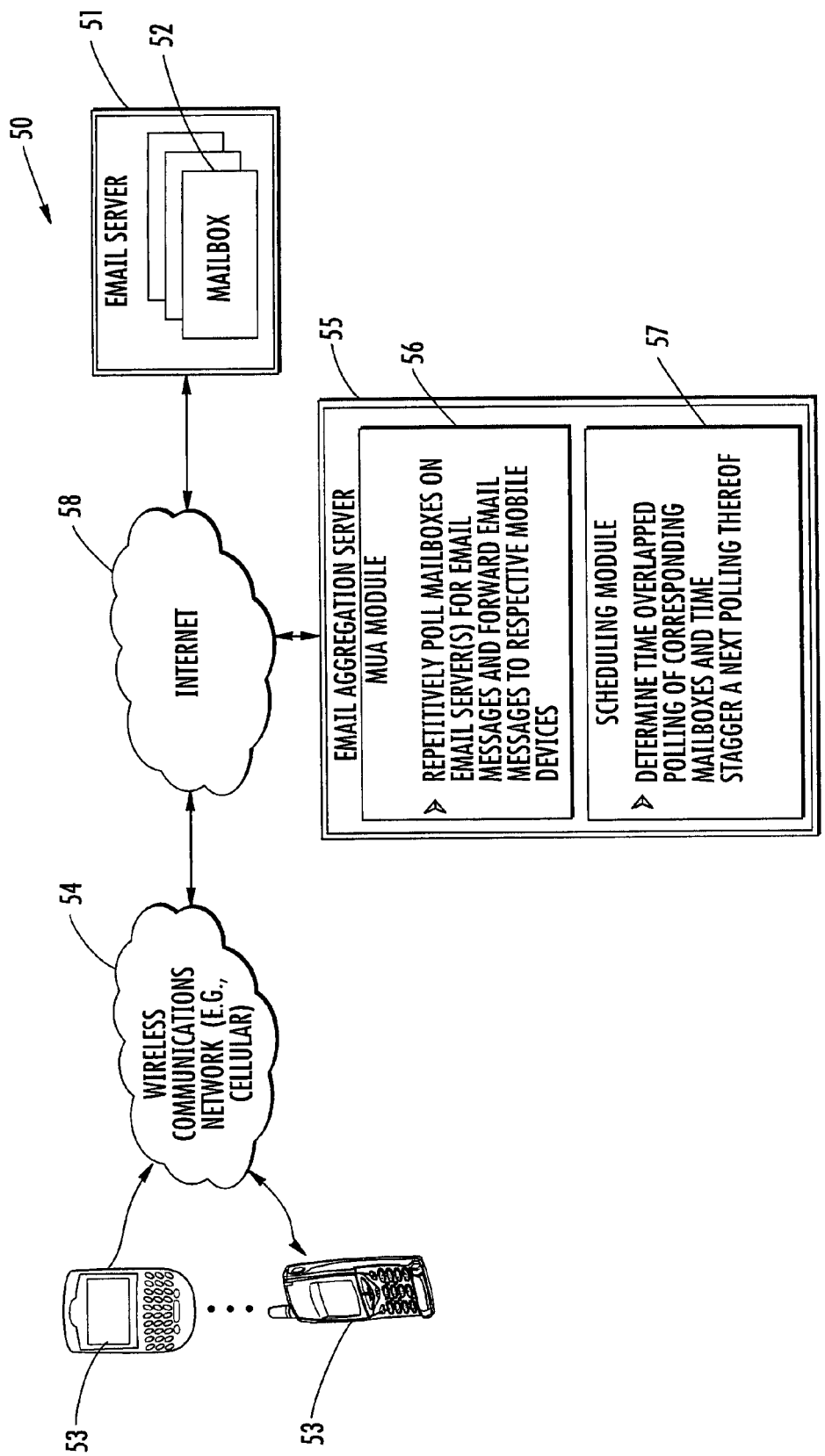
FIG. 10 is a schematic block diagram of still another email system providing time staggering of time overlapped polling operations.
Figure 11:
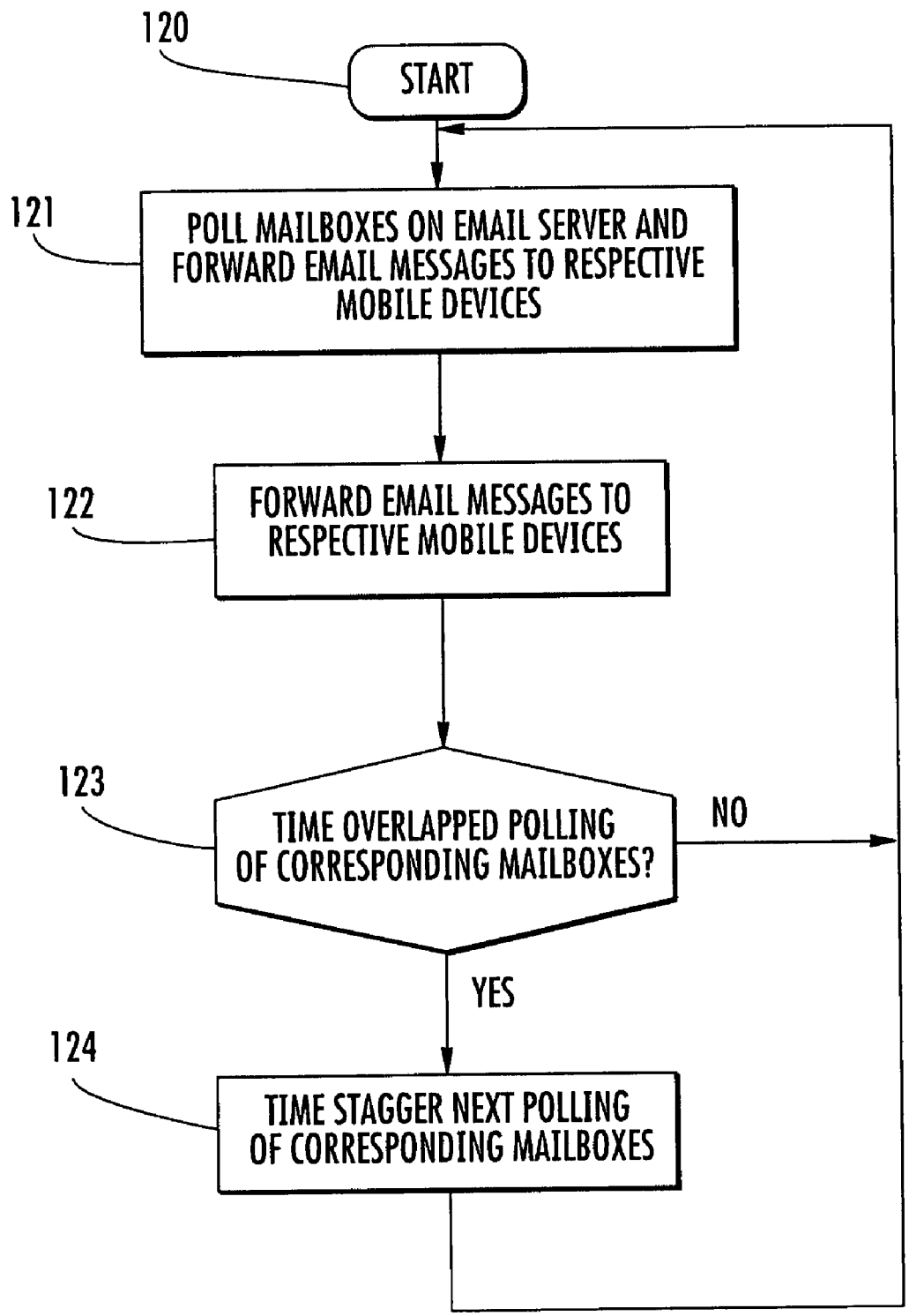
FIGS. 11 and 12 are flow diagrams illustrating related method aspects for the system of FIG. 10.
Figure 12:
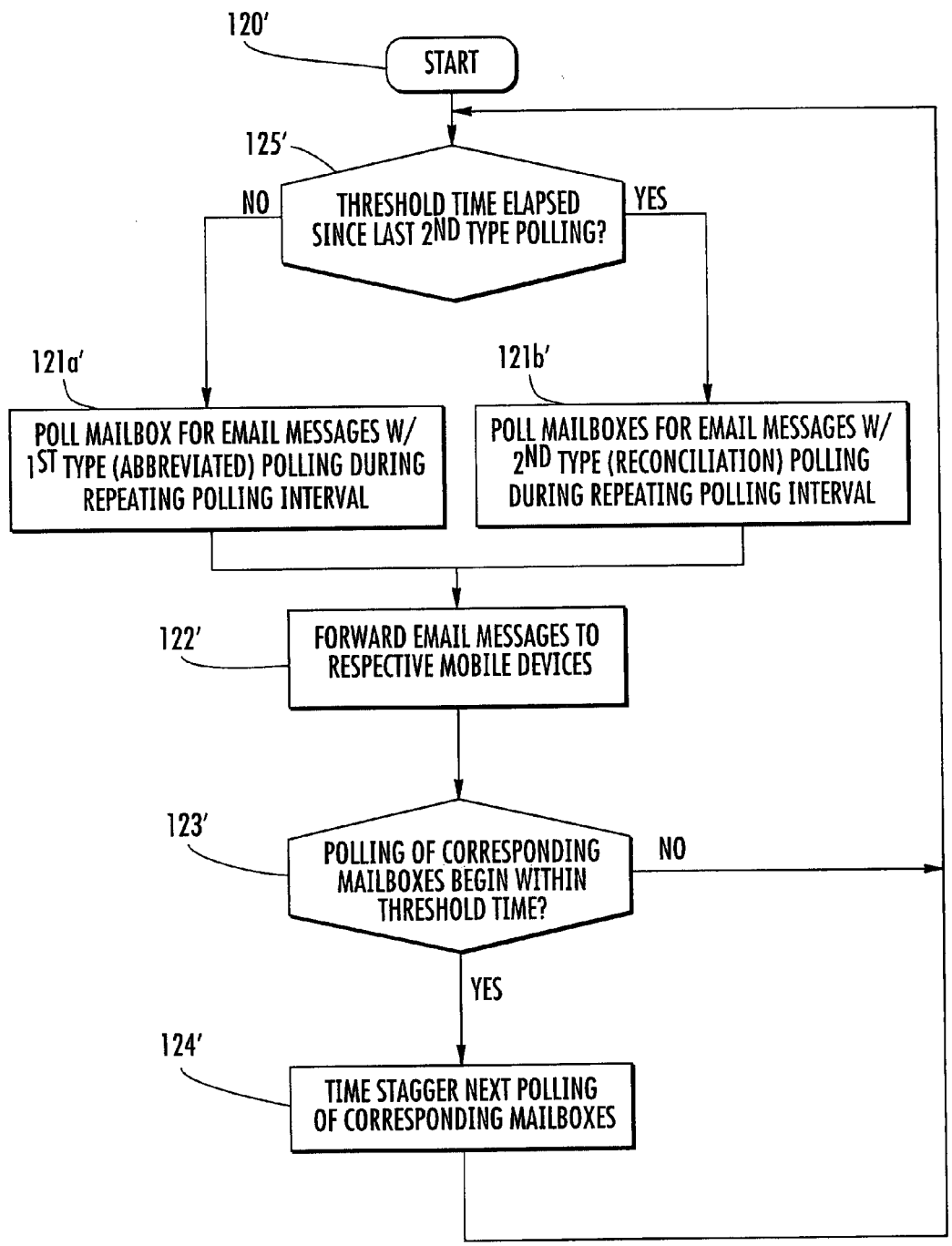
Figure 13:
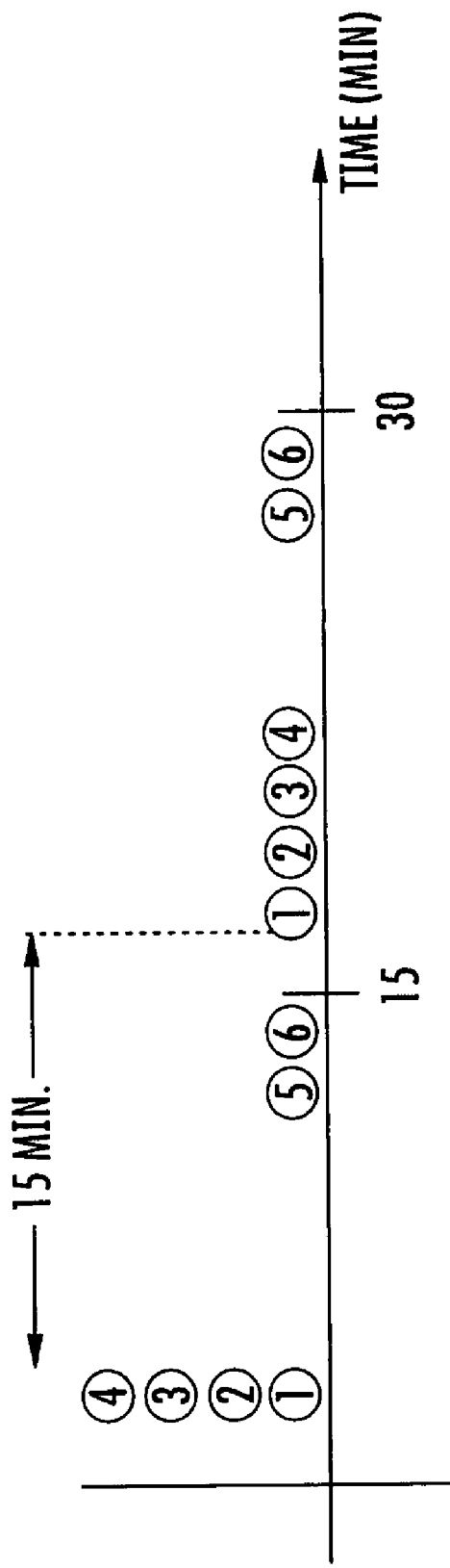
FIG. 13 is a timeline graph illustrating time staggering operations of the system of FIG. 10.
Figure 14:
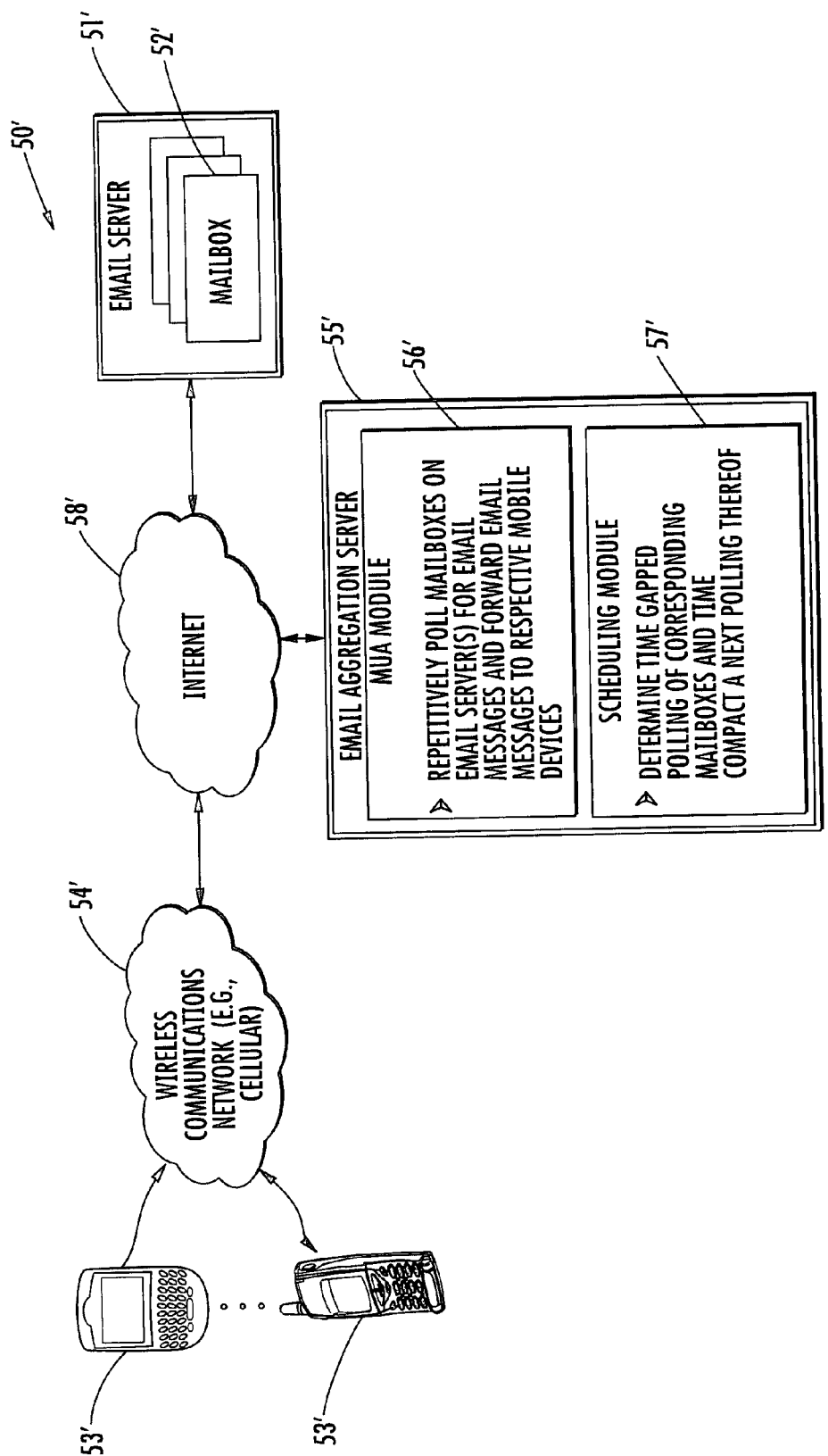
FIG. 14 is a schematic block diagram of yet another email system providing time compacting of time gapped polling operations.
Figure 15:
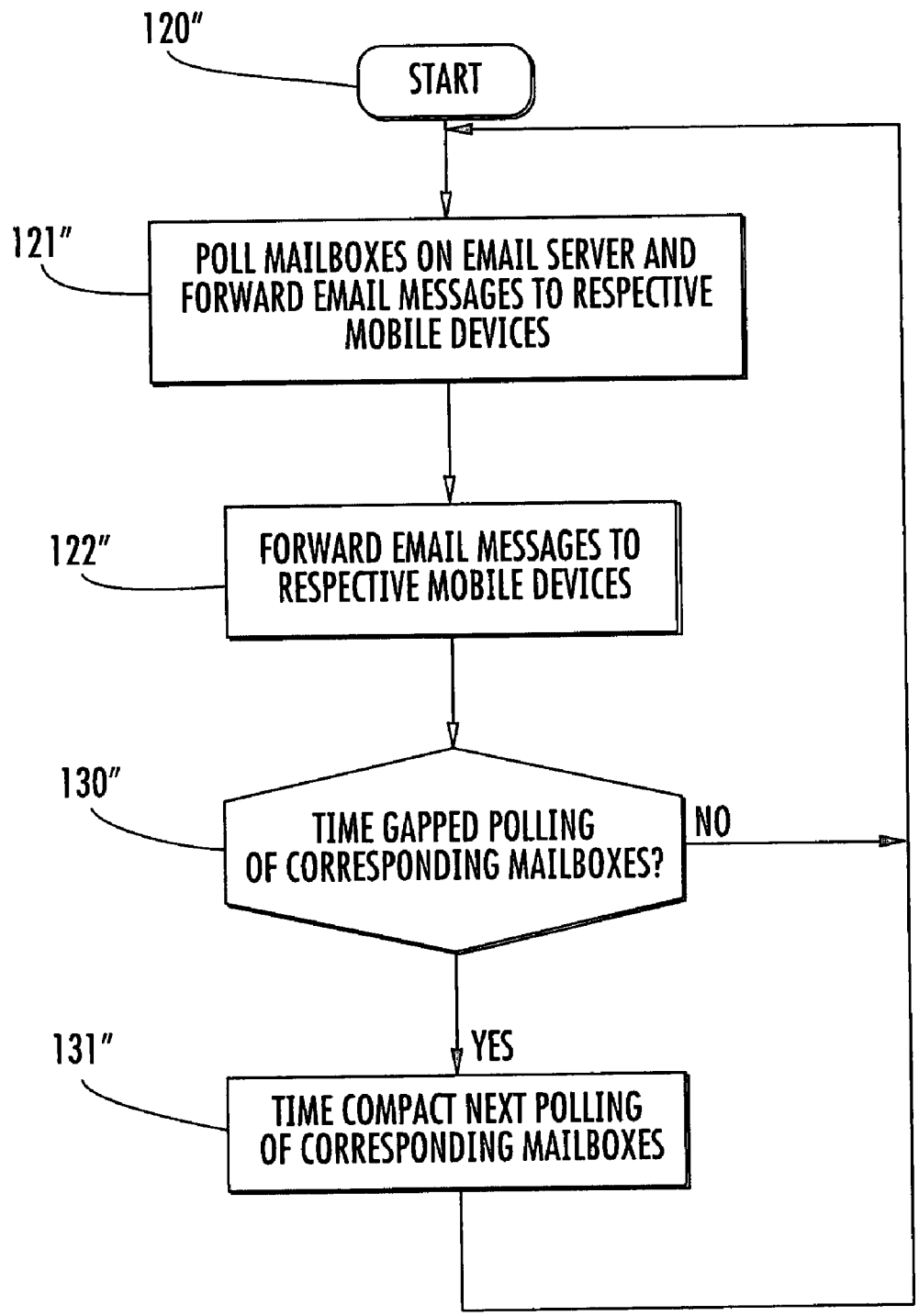
FIGS. 15 and 16 are flow diagrams illustrating related method aspects for the system of FIG. 14.
Figure 16:
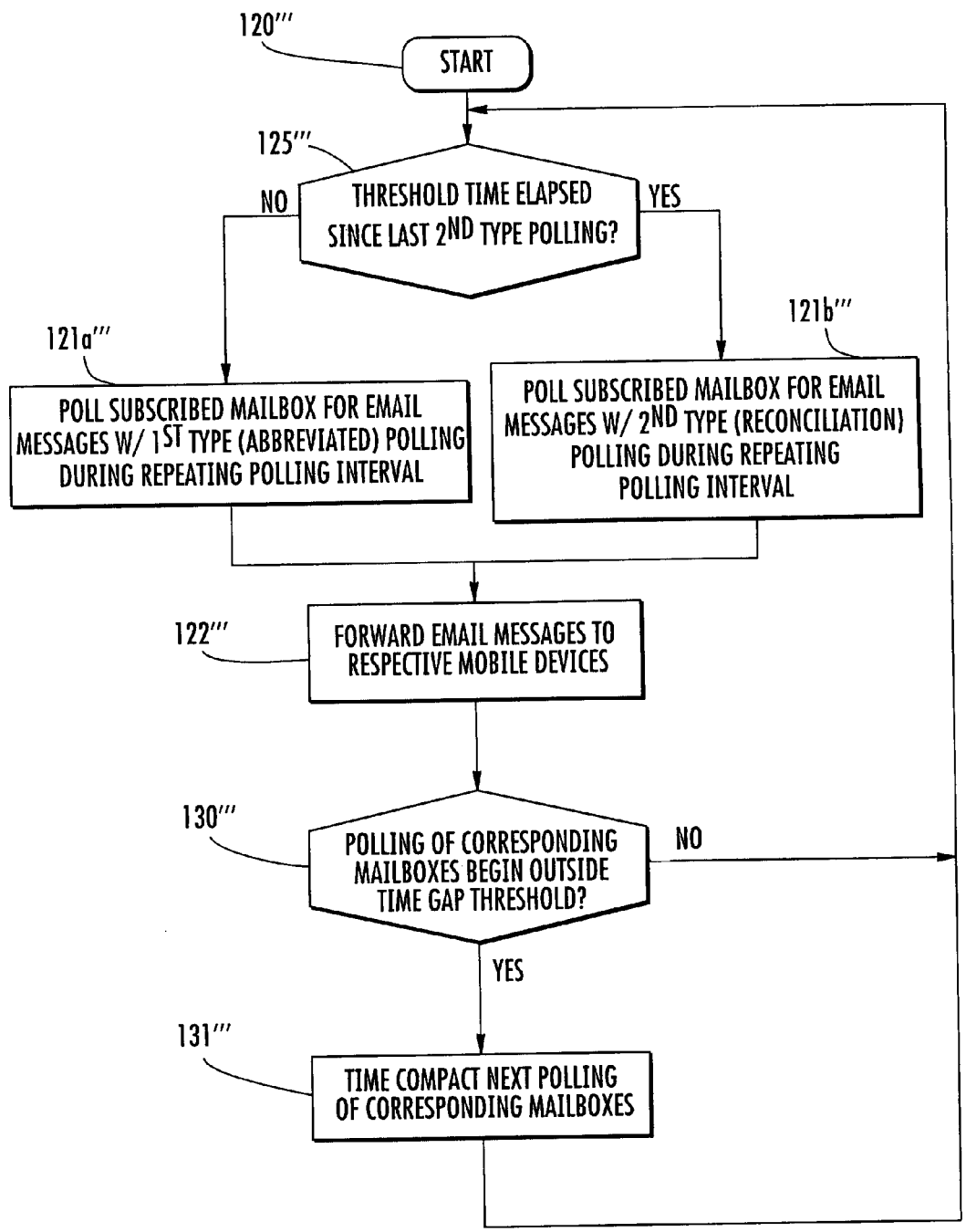

Turning now additionally to FIGS. 10-13, an embodiment in which the email aggregation server 55 advantageously determines time overlapped polling of corresponding mailboxes 52 and time staggers a next polling thereof is now described It should be noted that in FIG. 10, similar elements to those shown in FIG. 1 are indicated by decades (e.g., the wireless communications devices 53 in FIG. 14 are similar to the wireless communications devices 33 in FIG. 1, etc.). In practice, it is possible for polls of mailboxes 52 to get "bunched up" together, resulting in bursty polling traffic to the MUA module 56. Thus, the MUA module 56 may see little or no activity at times, and very heavy activity at other times causing under utilization and over utilization of its resources, respectively. As such, to alleviate the periods of over utilization, the email aggregation server 55 advantageously staggers overlapping polls so that when it is time to poll the same mailboxes again (e.g., during a next subinterval), the overlapped mailbox polls will be spread out.

The MUA module 56 polls mailboxes 52, at Block 121, as described above (e.g., using first and second polling types, at Blocks 125', 121a', 121b'), and forwards retrieved emails to respective mobile devices 53, at Block 122. When it is determined that there is time overlapped polling of a plurality of corresponding mailboxes 52, at Block 123, the scheduling module 57 advantageously time staggers a next polling of the corresponding mailboxes, as noted above (Block 124). By way of example, the scheduling module 57 may determine time overlapped polling based upon polling of corresponding mailboxes 52 beginning within a time overlap threshold, such as a predetermined number of seconds or milliseconds, for example (Block 123').

The foregoing will be further understood with reference to an exemplary implementation thereof. At system start-up, the scheduling module 57' calculates the rate at which mailboxes 52 should be scheduled for polling to get through all the sources once in a 15 minute (i.e., 900000 millisecond) subinterval, and spreads polling of the mailboxes over a 15 minute period using this rate.

For example, if the total number of sources is 9000 then the scheduling module 57 has to schedule a mailbox 52 for polling once every 900000/9000, i.e., every 100 milliseconds to poll all of the mailboxes once in the 15 minute polling subinterval. Subsequently, the scheduling module 56 constantly attempts to distribute the mailbox pollings such that mailboxes 52 become due for polling at regular intervals. It does this by continuously calculating the rate as described above when there are additions or deletions of mailboxes, and then scheduling the next pollable mailbox 52 for polling 100 ms after the last scheduled mailbox instead of scheduling it exactly 15 minutes out.

Stated alternately, the scheduling module 57 time staggers next pollings based upon the formula:

$$Tn(x)=Tc+I+x\Delta t,$$

where Tn(x) is a next polling time for a given overlapped polling, Tc is a current time, I is the polling time interval, x is an integer number between 1 and a total number of overlapped pollings to be staggered, and Δt is a staggering interval.

In this way, the scheduling module 57 constantly attempts to uniformly distribute the mailbox pollings such that they come due at a relatively steady rate. On average, each mailbox 52 will continue to be polled once every 15 minutes. However, there will be instances where mailboxes 52 will be polled again at times that are greater or less than 15 minutes.

The timeline shown in FIG. 13 illustrates how the above-described approach helps in smoothing out mailbox polls as they tend to get bunched up due to additions of new mailboxes, deletions due to sources becoming non-pollable, and expediting mailbox pollings (e.g., based upon the discovery of new mail), for example. In the illustrated example, polling for mailboxes (1)-(4) are initially overlapped (i.e., during a first subinterval between 0 and 15 minutes), but in a next polling subinterval they have been staggered consecutively as shown. That is, when mailboxes (1)-(4) become due for polling at the same time, the scheduling module 57 staggers mailbox (1) to 15 minutes from current time Tc (or 100 ms after the last mailbox for that matter), mailbox (2) to 100 ms after mailbox (1), and so on. Without this optimization, mailboxes (1)-(4) would have been due for polling again at the same time after 15 minutes.

Referring now additionally to FIGS. 14-17, the email aggregation server 55' may similarly determine time gapped polling of corresponding mailboxes 52' defined by at least one time gap between successive polls, at Block 122'', and time compact a subsequent polling of the corresponding mailboxes by removing the at least one time gap, at Block 131''. More particularly, the scheduling module 57' may determine time gapped polling based upon polling of corresponding mailboxes beginning outside of a time gap threshold. For example, using the above-described 100 millisecond intervals, a time gap may be determined based upon more than a 100 millisecond gap between scheduled polling operations, although other time gap thresholds may also be used.

Figure 17:
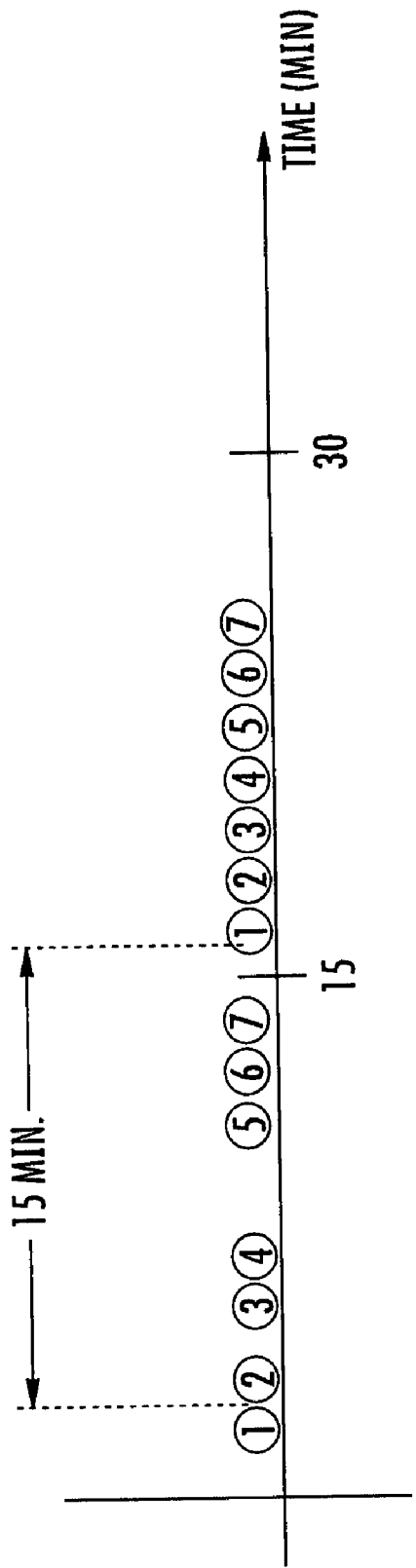
FIG. 17 is a timeline graph illustrating time compacting operations of the system of FIG. 14.

The foregoing will be further understood with reference to an exemplary case where there are periods with no mailboxes scheduled for polling, as illustrated in the first subinterval (i.e., from 0 to 15 minutes) of FIG. 17. The scheduling module will assign a nextPollTime such that these sources are due for polling 100 ms apart. As a result, the nextPollTime for some of these sources will be less than 15 minutes from the last time they were polled. In the illustrated example, there are not any mailboxes scheduled between mailboxes (2) and (3) nor between mailbox (4) and (5), leading to periods of inactivity for the MUA module 56'. In this case, by the time the scheduling module gets to mailbox (7), it will have organized the next poll times of mailboxes (1)-(6) such that they are due exactly 100 milliseconds apart after 15 minutes (i.e., during the second subinterval from 15 min. to 30 min.). Without this optimization, the periods of inactivity would continue to exist until such time as other mailboxes were added or otherwise expedited to occupy those slots.

It should be noted that one or more of the various polling and scheduling aspects described above may be used in a given email aggregation server/method. Moreover, depending upon the volume of mailboxes to be polled, the email aggregation server 35 may be one of multiple email aggregation servers (or divided into several partitions) cooperating to perform email aggregation for numerous users and mailboxes, as will be appreciated by those skilled in the art. Further details of a direct access email relay system in which the polling and scheduling operations described above may be implemented are provided in co-pending U.S. patent application Ser. No. 11/239,488 filed Sep. 29, 2005, which is assigned to the present Assignee and is hereby incorporated herein in its entirety by reference.

Exemplary components of a hand-held mobile wireless communications device 1000 that may be used in accordance the system 30 is further described in the example below with reference to FIG. 18. The device 1000 illustratively includes a housing 1200, a keypad 1400 and an output device 1600. The output device shown is a display 1600, which is preferably a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400 by the user.

The housing 1200 may be elongated vertically, or may take on other sizes and shapes (including clamshell housing structures). The keypad may include a mode selection key, or other hardware or software for switching between text entry and telephony entry.

Figure 18:
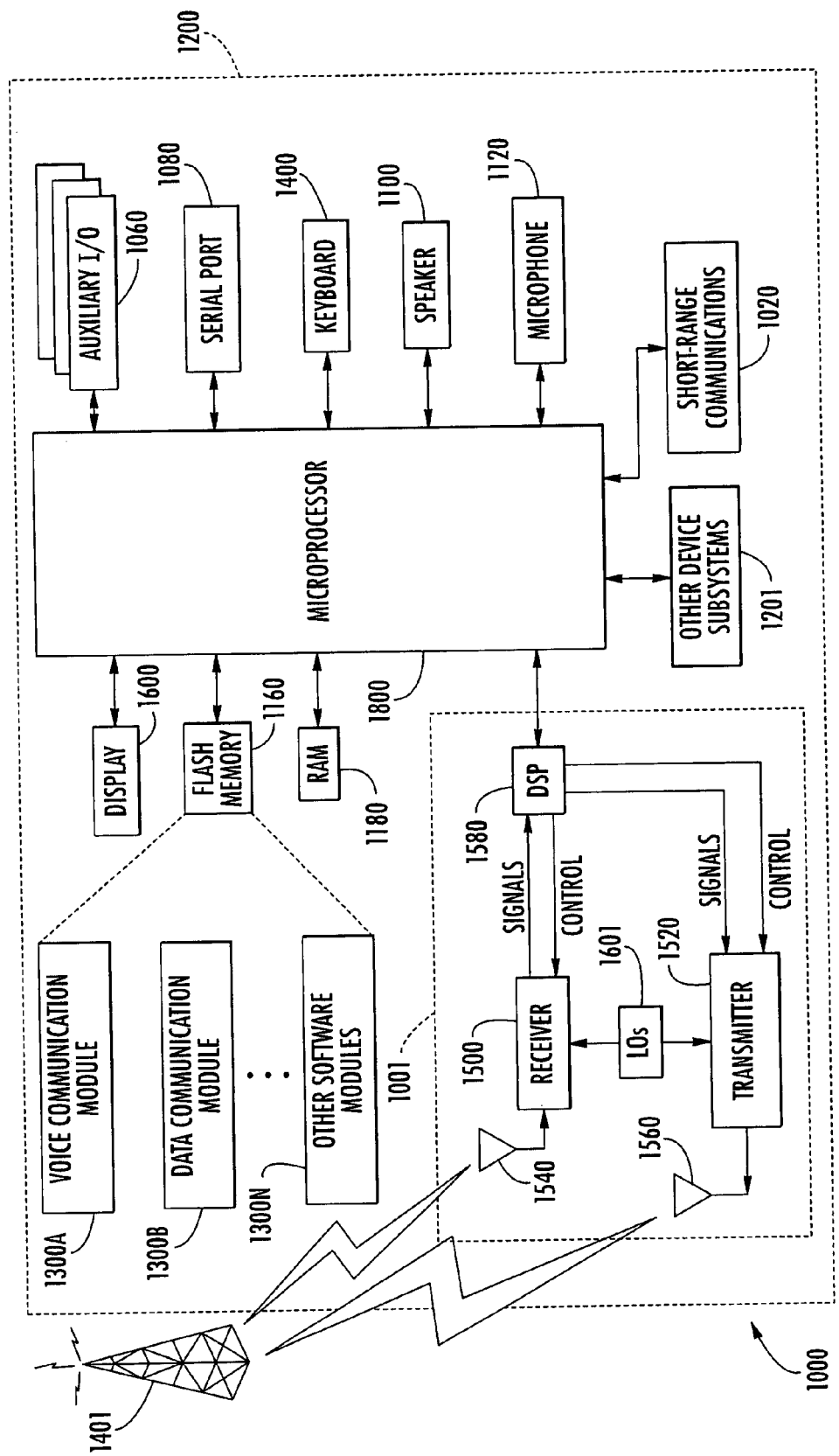
FIG. 18 is a schematic block diagram illustrating exemplary components of a mobile wireless communications device for use with an exemplary embodiment.

In addition to the processing device 1800, other parts of the mobile device 1000 are shown schematically in FIG. 18. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 is preferably a two-way RF communications device having voice and data communications capabilities. In addition, the mobile device 1000 preferably has the capability to communicate with other computer systems via the Internet.

Operating system software executed by the processing device 1800 is preferably stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 1401. Preferably, the PIM data items are seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. An electronic mail (email) system comprising:
    at least one email server having mailboxes for storing email messages, the mailboxes comprising subscribed mailboxes and unsubscribed mailboxes, the subscribed mailboxes generating new email message notifications;
    a plurality of mobile wireless communications devices; and
    at least one email aggregation server configured to:
        repetitively poll the mailboxes for email messages, and forward the email messages to respective ones of the mobile wireless communications devices;
        determine time overlapped polling of the mailboxes and time stagger a next polling thereof;
        for unsubscribed mailboxes, perform a first type polling comprising an abbreviated polling for new emails unless a threshold time has elapsed since a last second type polling comprising a reconciliation polling; and
        for subscribed mailboxes, upon receipt of a new email message notification from a respective subscribed mailbox, perform at least one of the first type polling and second type polling on the respective subscribed mailbox.

2. The email system of claim 1 wherein the at least one email aggregation server is configured to poll the mailboxes at least once during a repeating polling time interval.

3. The email system of claim 2 wherein the at least one email aggregation server time is configured to stagger next pollings based upon the formula:

$$Tn(x)=Tc+I+x\Delta t,$$

where $Tn(x)$ is a next polling time for a given overlapped polling, $Tc$ is a current time, $I$ is the polling time interval, $x$ is an integer number between 1 and a total number of overlapped pollings to be staggered, and $\Delta t$ is a staggering interval.

4. The email system of claim 2 wherein each polling time interval has a duration in a range of 30 minutes to 180 minutes.

5. The email system of claim 1 wherein the at least one email aggregation server is configured to determine time overlapped polling based upon polling of corresponding mailboxes beginning within a time overlap threshold.

6. The email system of claim 1 wherein the second type polling comprises a reconciliation polling of all emails.

7. The email system of claim 1 wherein at least some of the mobile wireless communications devices comprise cellular communications devices.

8. An electronic mail (email) system comprising:
    at least one email server having mailboxes for storing email messages, the mailboxes comprising subscribed mailboxes and unsubscribed mailboxes, the subscribed mailboxes generating new email message notifications;
    a plurality of mobile wireless communications devices; and
    at least one email aggregation server configured to:
        poll the mailboxes for email messages at least once during a repeating polling time interval, and forward the email messages to respective ones of the mobile wireless communications devices;
        determine time overlapped polling of the mailboxes and time stagger a next polling thereof, the determining of time overlapped polling being based upon polling of corresponding mailboxes beginning within a time overlap threshold;
        for unsubscribed mailboxes, perform a first type polling comprising an abbreviated polling for new emails unless a threshold time has elapsed since a last second type polling comprising a reconciliation polling; and
        for subscribed mailboxes, upon receipt of a new email message notification from a respective subscribed mailbox, perform at least one of the first type polling and second type polling on the respective subscribed mailbox.

9. The email system of claim 8 wherein each polling time interval has a duration in a range of 30 minutes to 180 minutes.

10. The email system of claim 8 wherein the at least one email aggregation server time is configured to stagger next pollings based upon the formula:

$$Tn(x)=Tc+I+x\Delta t,$$

where $Tn(x)$ is a next polling time for a given overlapped polling, $Tc$ is a current time, $I$ is the polling time interval, $x$ is an integer number between 1 and a total number of overlapped pollings to be staggered, and $\Delta t$ is a staggering interval.

11. An electronic mail (email) aggregation server comprising:
    a processor configured to:
        execute an aggregation module for repetitively polling mailboxes on at least one email server for email messages, and forwarding the email messages to respective ones of the mobile wireless communications devices, the mailboxes comprising subscribed mailboxes and unsubscribed mailboxes, the subscribed mailboxes generating new email message notifications;
        execute a scheduling module for determining time overlapped polling of the mailboxes and time staggering a next polling thereof;
        for unsubscribed mailboxes, perform a first type polling comprising an abbreviated polling for new emails unless a threshold time has elapsed since a last second type polling comprising a reconciliation polling; and
        for subscribed mailboxes, upon receipt of a new email message notification from a respective subscribed mailbox, perform at least one of the first type polling and second type polling on the respective subscribed mailbox.

12. The email aggregation server of claim 11 wherein the aggregation module is configured to poll the mailboxes at least once during a repeating polling time interval.

13. The email aggregation server of claim 12 wherein the scheduling module is configured to stagger next pollings based upon the formula:

$$Tn(x)=Tc+I+x\Delta t,$$

where $Tn(x)$ is a next polling time for a given overlapped polling, $Tc$ is a current time, $I$ is the polling time interval, $x$ is an integer number between 1 and a total number of overlapped pollings to be staggered, and Δt is a staggering interval.

14. The email aggregation server of claim 12 wherein each polling time interval has a duration in a range of 30 minutes to 180 minutes.

15. The email aggregation server of claim 11 wherein the scheduling module is configured to determine time overlapped polling based upon polling of corresponding mailboxes beginning within a time overlap threshold.

16. The email aggregation server of claim 11 wherein the second type polling comprises a reconciliation polling of all emails.

17. An electronic mail (email) aggregation method comprising:
   repetitively polling mailboxes on at least one email server for email messages, and forwarding the email messages to respective ones of the mobile wireless communications devices, the mailboxes comprising subscribed mailboxes and unsubscribed mailboxes, the subscribed mailboxes generating new email message notifications; and
   determining time overlapped polling of the mailboxes and time staggering a next polling thereof;
   wherein repetitively polling comprises
      for unsubscribed mailboxes, performing a first type polling comprising an abbreviated polling for new emails unless a threshold time has elapsed since a last second type polling comprising a reconciliation polling, and
      for subscribed mailboxes, upon receipt of a new email message notification from a respective subscribed mailbox, perform at least one of the first type polling and second type polling on the respective subscribed mailbox.

18. The method of claim 17 wherein repetitively polling comprises polling the mailboxes at least once during a repeating polling time interval.

19. The method of claim 18 wherein the scheduling module staggers next pollings based upon the formula:

$$Tn(x)=Tc+I+x\Delta t,$$

where $Tn(x)$ is a next polling time for a given overlapped polling, $Tc$ is a current time, $I$ is the polling time interval, $x$ is an integer number between 1 and a total number of overlapped pollings to be staggered, and $\Delta t$ is a staggering interval.

20. The method of claim 18 wherein each polling time interval has a duration in a range of 30 minutes to 180 minutes.

21. The method of claim 17 wherein determining time overlapped polling comprises determining time overlapped polling based upon polling of corresponding mailboxes beginning within a time overlap threshold.

22. The method of claim 17 wherein the second type polling comprises a reconciliation polling of all emails.

* * * * *